United States Patent [19]

Okazaki et al.

[11] Patent Number: 5,266,376
[45] Date of Patent: Nov. 30, 1993

[54] MAGNETIC RECORDING MEDIUM

[75] Inventors: Iwao Okazaki; Koichi Abe, both of Kyoto; Shoji Nakajima, Otsu, all of Japan

[73] Assignee: Toray Industries, Inc., Japan

[21] Appl. No.: 632,311

[22] Filed: Dec. 21, 1990

[30] Foreign Application Priority Data

Dec. 25, 1989 [JP] Japan .................................. 1-337282
Jan. 8, 1990 [JP] Japan ...................................... 2-2090

[51] Int. Cl.⁵ ....................... B32B 3/10; B32B 27/06; G11B 5/66
[52] U.S. Cl. ..................................... 428/141; 428/480; 428/694 SG; 428/900
[58] Field of Search ................. 428/694, 480, 900, 141

[56] References Cited

U.S. PATENT DOCUMENTS

| | | | |
|---|---|---|---|
| 3,783,023 | 1/1974 | Hungerford et al. | 428/900 |
| 4,135,031 | 1/1979 | Akashi et al. | 428/323 |
| 4,414,270 | 11/1983 | Miyoshi et al. | 428/325 |
| 4,461,794 | 7/1984 | Adachi et al. | 428/147 |
| 4,746,703 | 5/1988 | Dallmann et al. | 525/176 |
| 4,818,581 | 4/1989 | Katoh et al. | 428/143 |
| 5,051,292 | 9/1991 | Katoh et al. | 428/141 |

FOREIGN PATENT DOCUMENTS 0277783  8/1988  European Pat. Off. .
2173731A 10/1986  United Kingdom .

*Primary Examiner*—Paul J. Thibodeau
*Assistant Examiner*—Leszek Kiliman
*Attorney, Agent, or Firm*—Austin R. Miller

[57] ABSTRACT

A magnetic recording medium with excellent S/N ratio and durability is disclosed. The magnetic recording medium comprises a substrate film and a magnetic layer formed on at least one surface of the substrate film. The maximum depth of depressiones in the surface of the magnetic layer being larger than maximum height of peaks on the surface of the magnetic layer.

11 Claims, No Drawings ent specification and appended claims, are those deter-
MAGNETIC RECORDING MEDIUM

BACKGROUND OF THE INVENTION

I. Field of the Invention

This invention relates to a magnetic recording medium. More particularly, this invention relates to a magnetic recording medium of the type in which a magnetic layer is coated on a substrate film.

II. Description of the Related Art

Magnetic recording media of the type in which a magnetic layer is coated on a substrate film (hereinafter referred to as "coating type magnetic recording media") are known. A coating type magnetic recording medium is described in, for example, U.S. Pat. No. 4,684,546, which discloses a magnetic recording medium comprising a polyester film and a magnetic layer coated on the film.

In the conventional coating type magnetic recording media, the surface of the magnetic layer is made as smooth as possible in order to promote the S/N ratio (signal to noise ratio) in high density recording (The higher the S/N ratio, the better the quality of the recorded information, such as recorded images when the recording medium is a video tape). However, the smoother the surface of the magnetic layer, the higher the friction coefficient when the recording medium runs. Since higher friction coefficient more severely damages the recording medium, the durability of the recording medium having a magnetic layer with such a smooth surface is low, so that the high S/N ratio is sharply decreased when the magnetic recording medium is repeatedly used. On the other hand, if the surface of the magnetic layer is roughened in order to promote the durability, the S/N ratio is decreased. Thus, the effort to promote the S/N ratio impairs the durability of the recording medium, and vice versa.

SUMMARY OF THE INVENTION

Accordingly, an object of the present invention is to provide a magnetic recording medium with both high S/N ratio and durability.

The present inventors intensively studied to find that if the surface of the magnetic layer is irregular such that the maximum depth of the depressions in the surface of the magnetic layer from the center plane thereof is larger than the maximum height of the peaks of the protrusions on the surface of the magnetic layer from the center plane thereof, the magnetic recording medium exhibits high S/N ratio and the durability of the recording medium is also good.

That is, the present invention provides a magnetic recording medium comprising a substrate film and a magnetic layer formed on at least one surface of said substrate film, said magnetic layer having an irregular surface such that maximum depth of said depressions in said surface of said magnetic layer from the center plane thereof being larger than maximum height of peaks on the surface of said magnetic layer from the center plane thereof.

The magnetic recording medium of the present invention exhibits high S/N ratio in spite of the irregular surface of the magnetic layer, while the durability of the recording medium is excellent, so that the S/N ratio is kept high even if the recording medium is repeatedly used.

DETAILED DESCRIPTION OF THE PREFERRED EMBODIMENTS

As stated above, the magnetic recording medium of the present invention comprises a substrate film and a magnetic layer formed thereon.

The substrate film may preferably be a thermoplastic resin film, more preferably a biaxially oriented thermoplastic resin film. Although not restricted, preferred thermoplastic resins include polyesters, polyolefins, polyamides and polyphenylenesulfides. Among these, the thermoplastic resin films containing as major constituting units at least one selected from the group consisting of ethyleneterephthalate unit, ethylene $\alpha,\beta$-bis(2-chlorophenoxy)ethane-4,4'-dicarboxylate unit and ethylene 2,6-naphthalate unit are especially preferred because the running property of the recording medium is good.

On the substrate film, a magnetic layer is formed by coating. The most characteristic feature of the magnetic recording medium of the present invention resides in the configuration of the surface of the magnetic layer. Particularly, the surface of the magnetic layer is irregular. The maximum depth of the depressions (hereinafter also referred to as "SRv") in the surface of the magnetic layer is larger than the maximum height of the peaks (hereinafter also referred to as "SRp") on the same surface (this configurational feature is also hereinafter referred to as "depression-dominant"). It was surprisingly found by the present inventors that even if the surface of the magnetic layer is irregular, if the surface has the depression-dominant configuration, the S/N ratio of the recording medium is high, and the S/N ratio is not decreased so much even if the recording medium is repeatedly used. If the SRp is larger than the SRv (this configurational feature is hereinafter also referred to as "protrusion-dominant"), it is difficult to simultaneously satisfy the high S/N ratio and high durability.

It should be noted that the SRp and SRv, as well as SRa, SPc and SRz hereinbelow described, in the present specification and appended claims, are those determined by using a three dimensional surface roughness meter unless otherwise specified.

It is preferred that the SRv of the surface of the magnetic layer is larger than the SRp by not less than 10 nm, more preferably not less than 15 nm, still more preferably not less than 20 nm because higher S/N ratio and better durability (smaller reduction) of the S/N ratio may be obtained. Although there is no critical upper limit of the difference between the SRv and SRp (SRv − SRp), it is difficult to produce a magnetic layer with (SRv − SRp) of about not less than 300 nm.

It is also preferred that the ratio of the SRv to average surface roughness of the surface of the magnetic layer (hereinafter also referred to as "SRa"), that is, SRv/SRa be not more than 10, more preferably not more than 8 because higher S/N ratio and smaller reduction of S/N ratio may be attained.

It is also preferred that the number of the peaks on the surface of the magnetic layer, which peaks cross a region of −5 nm to +5 nm from the center plane of the surface of the magnetic layer in the direction of thickness thereof (hereinafter also referred to as "peak count" or "SPc") be not less than $100/0.1$ mm$^2$, more preferably not less than $150/0.1$ mm$^2$, still more preferably not less than $200/0.1$ mm$^2$ because higher S/N ratio and smaller reduction of the S/N ratio may be obtained. More particularly, the peak count is the number of protrusions per 0.1 mm², which protrusions start to rise from a point below −5 nm of the center plane of the surface of the magnetic layer up to a point above +5 nm of the center plane of the surface of the magnetic layer. The above-mentioned values of −5 nm and +5 nm are the distances from the center plane of the surface of the magnetic layer in the direction of thickness of the magnetic layer.

The average surface roughness of the surface of the magnetic layer may preferably be 3–45 nm, more preferably 10–30 nm because higher S/N ratio and smaller reduction of S/N ratio may be attained.

The surface of the magnetic layer may preferably have a ten-points average roughness (hereinafter also referred to as "SRz") of 30–450 nm, more preferably 50–300 nm because higher S/N ratio and smaller reduction of S/N ratio may be attained.

The magnetic powder contained in the magnetic layer is not restricted and may be an oxide such as iron oxide, chromium oxide or Co-coated iron oxide; a metal or an alloy such as Fe, Co, Fe-Co, Fe-Co-Ni or Co-Ni, or an alloy between these metals or alloys and Al, Cr, Si or the like. It is preferred that the magnetic powder be a metal or an alloy which substantially does not contain an oxide because the above-described configurational feature of the surface of the magnetic layer is easy to obtain, so that higher S/N ratio and smaller reduction of S/N ratio may be attained The magnetic powder may be admixed with a variety of binders so as to formulate a magnetic coating solution to be applied on the substrate film to form the magnetic layer. Although not restricted, the binder may preferably be a thermosetting resin-based binder or a radiation-setting resin-based binder. Other additives such as dispersants, lubricants, antistatic agents may be blended in the magnetic coating solution according to a conventional technique. For example, a binder comprising vinyl chloride/vinyl acetate/vinyl alcohol copolymer, polyurethane prepolymer and polyisocyanate may preferably be used.

Although not restricted, the thickness of the magnetic layer may preferably be 0.5–5 μm because the above-described configurational feature of the surface of the magnetic layer is easy to obtain, so that higher S/N ratio and smaller reduction of S/N ratio may be attained.

As will be later described in detail, in a preferred manufacturing process of the magnetic recording medium of the present invention, the magnetic medium is wound into a roll after the coating of the magnetic layer and before curing of the same, and curing of the magnetic layer is performed in the rolled state. With this manufacturing process, the above-described depression-dominant surface configuration of the magnetic layer is imparted by the surface configuration of the surface of the substrate film, which surface is on the side of the substrate film opposite to the magnetic layer because this surface contacts the surface of the magnetic layer when the recording medium is wound into a roll. Therefore, the configuration of the surface of the substrate film, which surface is opposite to the magnetic layer is important and preferably has a characteristic surface configuration (The surface of the substrate film having the characteristic configuration is hereinafter also referred to as "characteristic surface of the substrate film" or simply "characteristic surface"). More particularly, if the substrate film is one of the following (i)–(iv), the above-described configurational feature of the surface of the magnetic layer is easy to obtain, so that higher S/N ratio and smaller reduction of S/N ratio may be attained.

(i) The substrate film is a biaxially oriented thermoplastic resin film which has a layer A with a thickness of 0.005–3 μm, preferably 0.01–2 μm containing as major component a thermoplastic resin A and particles with an average particle size of 0.1–10 times, preferably 0.3–5 times the thickness of the layer A, the content of said particles in the layer A being 0.1–30%, preferably 0.2–20% based on the total weight of the layer A. In this case, the layer A is formed on the side of the substrate film, which is opposite to the magnetic layer.

(ii) The substrate film is a biaxially oriented thermoplastic resin film which contains particles and which has protrusions on a surface thereof, the average height of these protrusions being not less than ¼, preferably not less than 1/3.5, more preferably not less than ⅓ of the average particle size of the particles, the number of the protrusions being not less than 10,000/mm², preferably not less than 20,000/mm². In this case, the surface having the protrusions is formed at least on the side opposite to the magnetic layer.

(iii) The substrate film is a biaxially oriented thermoplastic resin film which contains particles and which has a surface with protrusions, the number of these protrusions having a height of not higher than ⅓ of the average particle size of the particles being not more than 70%, preferably not more than 65% of the total protrusions. In this case, the surface just described above is formed at least on the side of the substrate film opposite to the magnetic layer.

(iv) The substrate film is a biaxially oriented thermoplastic resin film which has a surface with protrusions, the ratio of maximum height to average height of these protrusions being 1.1–3, preferably 1.1–2.5. In this case, the surface with the protrusions is formed at least on the side opposite to the magnetic layer.

In the above-described cases (ii)–(iv), the characteristic surface exists at least on the side of the substrate film opposite to the magnetic layer. Thus, the substrate film may be a monolayered film having the characteristic surface configurations on the both surfaces or only on the side opposite to the magnetic layer, or may be a laminated film as in the case (i) in which a film with the characteristic surface configuration is laminated on the side opposite to the magnetic layer or on the both sides of the substrate film. It should be noted that the thickness of the magnetic layer coated on the substrate film is much larger than the height of protrusions on the characteristic surface of the substrate film, even if the magnetic layer is formed on the protrusion-dominant characteristic surface of the substrate film, the coated magnetic layer is not made to be protrusion-dominant, so that no adverse affects are presented even if the magnetic layer is formed on the protrusion-dominant characteristic surface of the substrate film. Thus, as mentioned above, the substrate film may have the characteristic surface at both sides thereof. In cases where both sides of the substrate film has the characteristic surface, the magnetic layer may be formed on either of the surfaces.

In the above-described case (i), preferred examples of the thermoplastic resin A include crystalline thermoplastic resins such as polyesters, polyolefins, polyamides, particularly crystalline polyesters. Among the crystalline polyesters, those containing as major constituting units at least one selected from the group consisting of ethyleneterephthalate unit, ethylene α,β-bis(2-chlorophenoxy)ethane-4,4'-dicarboxylate unit, ethylene 2,6-naphthalate unit are especially preferred because the surface configuration of the magnetic layer defined in the present invention is easy to obtain. The term "crystalline" herein means that the film is not amorphous. More specifically, the term "crystalline" means that the melting point can be detected by a thermal analysis using a differential scanning calorimeter (DSC) under a temperature-elevating rate of 10° C./min. Preferably, the crystallization parameter ΔTcg is not higher than 150° C. Further, it is especially preferred that the crystallinity be not less than 7.5 cal/g in terms of the heat of fusion (change in enthalpy of fusion) because better running property may be attained.

The particles contained in the substrate film for forming the characteristic surface of the substrate film may preferably have substantially spherical shape, that is, the particle size ratio (longer particle diameter/shorter particle diameter) of the particles may preferably be 1.0–1.3 because the above-described configurational feature of the surface of the magnetic layer is easy to obtain, so that higher S/N ratio and smaller reduction of S/N ratio may be attained. The particles may preferably be substantially spherical silica particles originating from colloidal silica, or crosslinked polymer particles (e.g., crosslinked polystyrene, silicone or polyimide), although the particles are not restricted thereto. The particles of titanium dioxide, alumina, calcium carbonate, kaolinite and the like which are conventionally used in this field may also be employed if the film-forming conditions are appropriately selected. The particles may preferably have an average particle size (diameter) of 5–2000 nm, more preferably 10–1500 nm, still more preferably 10–1000 nm because the above-described configurational feature of the surface of the magnetic layer is easy to obtain, so that higher S/N ratio and smaller reduction of S/N ratio may be attained.

The characteristic surface of the substrate film may preferably have an index of crystallization of attenuated total reflection Raman of not more than 20 cm$^{-1}$ because the above-described configurational feature of the surface of the magnetic layer is easy to obtain, so that higher S/N ratio and smaller reduction of S/N ratio may be attained.

The characteristic surface of the substrate film may preferably have a surface layer particle density ratio determined as later described in detail by secondary ion mass spectrum (SIMS) of not more than 1/10, more preferably not more than 1/50. If the surface layer particle density ratio is within this range, the above-described configurational feature of the surface of the magnetic layer is easy to obtain, so that higher S/N ratio and smaller reduction of S/N ratio may be attained. Further, the running properties and output properties are improved. Still further, the shaving resistance of the film surface is improved, so that the troubles caused by the drop out of the particles during the manufacturing process such as film-forming step, magnetic layer-coating step or calendering step are greatly reduced.

In cases where the substrate film is a laminated film, the layer other than the layer forming the characteristic surface may also contain particles preferably in the amount of not more than 1% by weight. In this case, the particles may have a particle size larger or smaller than those contained in the layer forming the characteristic surface or may have about the same particle size as those contained in the layer forming the characteristic surface, or may be a mixture thereof.

In the substrate film of the magnetic recording medium of the present invention, another polymer as well as conventional organic additives such as anti-oxidants, thermal stabilizers, lubricants and UV absorbers may be blended in the amount not adversely affecting the advantageous effects of the present invention.

Since the depression-dominant surface configuration of the magnetic layer may be imparted by other methods in which the configuration of the surface of the substrate film opposite to the magnetic layer is not utilized for giving the depression-dominant configuration as described later, the magnetic layer with the depression-dominant configuration may formed on both sides of the substrate film. Such a magnetic recording medium with magnetic layers on both sides of the substrate film is also within the scope of the present invention. Further, magnetic recording media having a magnetic layer with depression-dominant surface configuration and a smooth magnetic layer on the opposite side of the substrate film are also within the scope of the present invention.

In cases where the magnetic layer is formed on only one side of the substrate film, the conventional so called backcoat treatment may be performed on the surface of the substrate film opposite to the magnetic layer. In this case, the thickness of the backcoat layer may preferably be 0.1–1.5 μm, preferably 0.1–0.8μm, and the average surface roughness Ra of the backcoat layer may preferably be 5–200 nm, more preferably 5–100 nm, still more preferably 5–50 nm because the above-described configurational feature of the surface of the magnetic layer is easy to obtain, so that higher S/N ratio and smaller reduction of S/N ratio may be attained.

A preferred process for manufacturing the magnetic recording medium of the present invention will now be described. It should be noted, however, the process of manufacturing the magnetic recording medium of the present invention is not restricted to the process which will now be described.

Firstly, a preferred process for producing a laminated substrate film with one or two characteristic surfaces will now be described.

As described above, the preferred substrate film contains particles therein. The particles may be mixed with the thermoplastic resin by mixing the particles with ethyleneglycol to form ethyleneglycol slurry. By using the ethyleneglycol slurry containing the particles for the polymerization with an acid component, a polyester containing particles may be obtained. Alternatively, the particles may be blended in the thermoplastic resin by using a double-axes mixing extruder. These methods are preferred because a film suitable as the substrate film which is not broken when drawn may be obtained.

The content of the particles may preferably be adjusted by preparing a master polymer containing particles with high density and diluting the master polymer with a thermoplastic resin which does not substantially contain particles during the film-forming step so as to adjust the density of the particles in the mixed polymer to a desired value.

The thus obtained thermoplastic resin A containing adjusted density of particles is pelletized by the conventional method and is dried if necessary. The pellets of the thermoplastic resin A is then supplied to a conventional lamination melt-extruder and is extruded from a die in the form of a slit so as to form a sheet, followed by solidification on a casting roll. This extrusion step is carried out using two or three extruders, a two or three-layered manifold or joining block such that two or three sheets of films of thermoplastic resin A and thermoplastic resin B are extruded in laminated condition and the laminated sheet is cooled on a casting roll to solidify the laminated sheet, thereby obtaining non-oriented laminated film. In this case, the thickness of the layer A (which will form the characteristic surface of the substrate film) made of the thermoplastic resin A is so controlled as to attain a thickness of 0.8-80 times the average particle diameter contained in the thermoplastic resin A. In this extrusion step, it is preferred to provide a conventional static mixer or a gear pump in the polymer path of the thermoplastic resin A for obtaining a suitable substrate film which is not broken when drawn. As the joining block, feed blocks with rectangular cross section are preferred for obtaining the desired substrate film.

Although the above description is mainly directed to the preparation of a laminated film of A/B or A/B/A structure (the surface of the layer A is the characteristic surface), laminated films with A/B/C structure may also be prepared in the similar manner. That is, using three extruders and a three-layered manifold or joining block, thermoplastic resins A, B and C are laminated and the three-layered sheet is extruded from the die. In this case, the thermoplastic resins A, B and C may be the same or different (the surfaces of layers A and C are characteristic surfaces).

The thus obtained non-oriented film is then drawn in two directions so as to biaxially orient the film. The conventional sequential drawing methods in which the drawing of the film is carried out sequentially in the order of longitudinal direction and transverse direction or transverse direction and longitudinal direction, as well as the conventional simultaneous biaxial drawing methods may be employed. Although the preferred drawing conditions vary depending on the thermoplastic resin constituting the film, it is generally preferred to control the drawing ratios such that the product of the drawing ratio in the longitudinal direction and the drawing ratio in the transverse direction is not less than 8 for attaining the preferred relationship between the particle size and the thickness of the laminated layer A so as to optimize the surface configuration of the characteristic surface. Further, by employing such drawing ratios, the polymer molecules in the vicinity of the characteristic surface are biaxially oriented and the entire film has desired mechanical properties. It is an important feature that the polymer molecules in the vicinity of the characteristic surface are biaxially oriented, which feature cannot be attained by the conventional coating method or coating-drawing method. By virtue of the biaxial orientation of the polymer molecules in the vicinity of the characteristic surface, the surface configuration of the magnetic layer defined in the present invention is easy to obtain, so that higher S/N ratio and smaller reduction of S/N ratio may be attained. Further, the shaving resistance of the film surface is improved, so that the troubles caused by the drop out of the particles during the manufacturing process such as film-forming step, magnetic layer-coating step or calendering step are greatly reduced. The thus obtained biaxially oriented film is preferably drawn again in one direction because better mechanical properties may be attained. The thus prepared biaxially oriented film is then preferably heat set at a temperature below the melting point of the thermoplastic resin and higher than a temperature of the melting point minus 100° C. for 0.5-60 seconds.

Then a magnetic layer is coated on the thus prepared substrate film. The coating of the magnetic layer may be carried out by the conventional methods. Among the conventional methods, the methods using a gravure roll or a geasa are preferred because the surface configuration of the magnetic layer defined in the present invention is easy to obtain, so that higher S/N ratio and smaller reduction of S/N ratio may be attained. In cases where both sides of the substrate film are the characteristic surfaces (A/B/A), the magnetic layer may be formed in either of the surfaces, and in cases where only one surface of the substrate film is the characteristic surface (A/B), the magnetic layer is formed on the surface other than the characteristic surface.

The magnetic layer may preferably be dried at a temperature of 90°-120° C.

The resulting film is then subjected to a conventional calendering step. The calendering step is preferably carried out by using an elastic roller made of a polyamide or polyester resin at a temperature of 20°-80° C. under a pressure of 100-500 kg/cm because the surface configuration of the magnetic layer defined in the present invention is easy to obtain, so that higher S/N ratio and smaller reduction of S/N ratio may be attained.

The thus prepared film having a magnetic layer coated thereon is then wound into a roll and the magnetic layer is cured in the rolled state. The tension of the film during this winding step may preferably be 3 kg/m-20 kg/m, and the curing temperature may preferably be 40°-100° C. because the surface configuration of the magnetic layer defined in the present invention is easy to obtain, so that higher S/N ratio and smaller reduction of S/N ratio may be attained.

The thus obtained raw magnetic recording medium (with wide width) is then slit to prepare magnetic recording media. In cases where a backcoat layer is formed on the surface of the substrate film opposite to the magnetic layer, the backcoat layer may be coated at any time, that is, before the coating of the magnetic layer, before the calendering step, after the calendering step and before the curing step of the magnetic layer, or after the curing step of the magnetic layer. It is most preferred to carry out the coating of the backcoat layer after the curing step of the magnetic layer.

Although by the above-described process, the depression-dominant surface configuration of the magnetic layer is imparted by the characteristic surface of the substrate film, the depression-dominant surface configuration of the magnetic layer may be given by other methods which do not utilize the characteristic surface of the substrate film.

For example, a magnetic layer with a smooth surface may be pressed with a roll with a surface having the configuration of the above-described characteristic surface of the substrate film. For example, the magnetic layer with a smooth surface may be pressed with a roll comprising the above-described substrate film wound about a core roll. By this operation, the surface of the smooth magnetic layer may be embossed so as to obtain the depression-dominant surface configuration defined in the present invention.

Alternatively, the above-described substrate film having one characteristic surface is tightly wound into a roll so as to give depression-dominant surface configuration to the surface other than the characteristic surface. By coating a magnetic layer on the thus prepared depression-dominant surface of the substrate film, a magnetic layer with depression-dominant surface configuration may be formed.

The magnetic recording medium of the present invention is useful for wide variety of recording media including video tapes, floppy disks, video floppy disks, audio tapes, memory tapes and the like, and is especially useful for high density magnetic recording media including 8 mm video tapes, 8 mm high band video tapes, SVHS video tapes, digital video tapes and HDTV (high definition TV, high quality TV) and for video tape softwares which are repeatedly used.

The method of determining the characteristics concerning the present invention and the method of evaluating the effects of the present invention will now be described.

(1) Average Particle Size of Particles

Thermoplastic resin is removed from the film by the plasma low temperature ashing treatment to expose the particles. The conditions of the ashing treatment are selected so that the particles are not damaged whereas the thermoplastic resin is ashed. The resulting exposed particles are observed with scanning electron microscope (SEM) and the image of the particles is processed with an image analyzer. Changing the portion to be observed, not less than 5000 particles are processed according to the following data processing equation and the obtained number average diameter D is defined as the average particle size of the particles:

$$D = \Sigma Di/N$$

wherein Di represents the circle-corresponding diameter, N represents the number of the particles.

(2) Particle Size Ratio

The particle size ratio is the ratio of (average longer diameter)/(average shorter diameter) of each particle, which is obtained in (1). That is, the average longer diameter and the average shorter diameter of a particle are obtained by the following equations, respectively:

$$\text{Average Longer Diameter} = \Sigma D1/N$$

$$\text{Average Shorter Diameter} = \Sigma D2/N$$

wherein D1 and D2 represent the longer diameter (maximum diameter) and the shorter diameter (minimum diameter) of a particle, respectively, and N represents the number of particles.

(3) Relative Standard Deviation of Particle Size

The relative standard deviation of particle size is defined as $(\sigma/D)$ wherein $\sigma$ represents the standard deviation defined by the following equation:

$$\sigma = \{\Sigma(Di-D)^2/N\}^{\frac{1}{2}}$$

wherein Di, D and N represent the same meaning as in (1).

(4) Content of Particles

The film is treated with a solvent which dissolves the thermoplastic resin but which does not dissolve the particles. The resultant is centrifuged to separate the particles. The content of the particles is defined as the ratio of the weight of the separated particles to the total weight of the film.

(5) Crystallization Parameter $\Delta Tcg$, Heat of Fusion

The crystallization parameter $\Delta Tcg$ and the heat of fusion of the film are measured by differential scanning calorimetry (DSC). The DSC is carried out as follows:

Ten milligrams of a sample is placed in a DSC apparatus and the sample is fused at 300° C. for 5 minutes, followed by being rapidly cooled in liquid nitrogen. The rapidly cooled sample is then heated at a rate of 10° C./min. to find the glass transition point Tg. The heating of the sample is still continued and the crystallization exothermic peak temperature from the glass state is determined. The crystallization exothermic peak temperature is defined as the cooling crystallization point Tcc. The heating of the sample is still continued and the heat of fusion is determined from the peak of fusion. The difference between Tg and Tcc (Tcc−Tg) is defined as the crystallization parameter $\Delta Tcg$.

(6) Crystallization Index of Attenuated Total Reflection Raman

The attenuated total reflection Raman spectrum is measured and the total reflection Raman crystallization index is defined as the half value of the width of the stretching vibration of carbonyl group at 1730 cm$^{-1}$. The portions subjected to the measurement have a depth of 50–100 nm from the surface of the film. The measuring conditions are as follows:

a) Light Source

Argon Ion Laser (514.5 nm)

b) Setting of Sample

The surface of the sample film is pressingly contacted with a totally reflecting prism and the impinging angle of the laser beam to the prism (the angle between the impinging laser beam and the direction of thickness of the film) is 60°.

c) Detector

PM:RCA31034/Photon Counting System (Hamamatsu C1230) (supply 1600 V), commercially available from Hamamatsu Photonics, Hamamatsu, Japan d) Measuring Conditions Slit: 1000 μm Laser: 100 mW Gate Time: 1.0 sec.

Scanning Speed: 12 cm$^{-1}$/min.

Sampling Interval: 0.2 cm$^{-1}$

Repeat Time: 6

(7) Surface Layer Particle Density Ratio

Using secondary ion mass spectrum (SIMS), the ratio of the density of the element with the maximum density among the elements originating from the particles in the film to the density of the carbon in the thermoplastic resin, which ratio is defined as particle density, is determined at various points along the direction of thickness of the film. The ratio A/B of the particle density A at the outermost surface (at a depth of 0) measured by SIMS (defined as the particle density at surface) to the maximum particle density B obtained by analyzing the sample film in the direction of thickness thereof is defined as the density ratio of layer. The measuring apparatus and the measuring conditions are as follows:

Primary Ion Species: $O_2^+$

Primary Ion Acceleration Voltage: 12 kV

Primary Ionic Current: 200 nA

Luster Region: 400 μm□

Analyzed Region: Gate 30%
Measuring Vacuum: $6.0 \times 10^{-9}$ Torr
E-GUN: 0.5 kV–3.0A (8) Height of Protrusions on Surface, Height Distribution of the Same and Number of the Same The height of protrusions measured with a double-detection type scanning electron microscope (ESM-3200, commercially available from Elionics) by scanning the surface of the film setting the planar portion of the surface as the base (height 0) is transferred to an image processor (IBAS2000, commercially available from Carlzeis) and an image of surface protrusions is reconstructed on the display of the image processor. The surface protrusion image is converted to binary data and the height of each protrusion, which is defined as the highest value of the portions of the protrusion converted to the binary date, is determined. The measurement is repeated 500 times changing the area to be observed, and the average height thereof is defined as the average height of protrusions. The magnification of the scanning electron microscope is 1000 to 8000 times. The average interval between adjacent protrusions is calculated from the number of protrusions. In some cases, the height obtained by using a high precision light interference type three dimensional surface analyzer (e.g., TOPO-3D commercially available from WYKO Co., Ltd.; objective lens: 40–200 magnifications) may be employed in place of the height measured by using the scanning electron microscope.

(9) Surface Configuration of Magnetic Layer

The three dimensional surface roughness, that is, the average surface roughness SRa, average surface roughness of 10 points SRz, maximum height of peaks from the center plane SRp, maximum depth of depressions from the center plane SRv and peak counts SPc as defined above were measured by using a non-touching surface roughness meter HIPOSS (ET-30HK type) commercially available from Kosaka Kenkyujo. The values mentioned in the Examples hereinbelow described are average values of 20 times measurements. The measurement conditions were as follows:
Longitudinal Magnification: 20,000 magnifications
Transverse Magnifications: 500 magnifications
Cut Off: 0.08 mm
Feeding Pitch: 0.5 $\mu$m
Length of Measured Portion: 500 $\mu$m
Area of Measured Portion: 0.0194 mm$^2$
Scanning Speed: 100 $\mu$m/sec.

(10) Average Surface Roughness Ra of Backcoat Layer

The average surface roughness Ra of backcoat layer is measured by using a surface roughness meter. The measuring conditions are as follows:
Radius of Tip of Touching Stylus: 0.5 $\mu$m
Load of Touching Stylus: 5 mg
Length of Measured Portion: 1 mm
Cut Off: 0.08 mm

(11) Thickness of Laminated Layer in Substrate Film

Using secondary ion mass spectrum (SIMS), the ratio of the density of the element with the maximum density among the elements originating from the particles in the film to the density of the carbon in the thermoplastic resin, which ratio (M$^+$/C$^+$) is defined as particle density, is defined at various points along the direction of thickness of the film. The region from the surface of the film to a depth of 3000 nm from the surface is analyzed. Due to the existence of an interface (i.e., surface), the particle density is low in the vicinity of the surface and increases with the depth from the surface. In a preferred mode of the present invention, after the particle density reaches a maximum value, the particle density is decreased with the depth. From the obtained particle density distribution curve, the depth of the point at which the particle density is half of the maximum particle density (this point is deeper than the point at which the maximum particle density is obtained) is determined, which is defined as the thickness of the laminated layer in the substrate film. The measuring conditions are the same as described in (7).

In cases where the particles with the maximum content in the region from the surface to a depth of 3000 nm are organic high polymer particles, it is difficult to analyze by SIMS. In these cases, the depth profile as mentioned above may be determined by X-ray photoelectron spectroscopy (XPS) or infrared spectroscopy (IR) while etching the film from the surface so as to determine the thickness of the laminated layer in the film. Alternatively, a cross section of the film is observed with an electron microscope, and the thickness of the laminated layer may be determined by finding an interface from the changing conditions of the particle density or the differences of contrast.

(12) S/N Ratio of Magnetic Recording Media

The magnetic recording medium is set in a cassette to prepare a 8 mm VTR tape. On the thus prepared VTR tape, 100% chroma signals from a commercially available television testing wave generator (TR7/U706 commercially available from Shibasoku Co., Ltd., Japan) are recorded. Chroma S/N of the regenerated signals are measured using a commercially available color video noise-measuring apparatus (925D/1 commercially available from Shibasoku Co., Ltd.).

The thus measured chroma S/N was compared with that obtained by using a commercially available Hi8 tape (8 mm VTR tape for high band, Hi8MP120 commercially available from Sony). When the S/N ratio is higher than that obtained by using the Hi8 tape by not less than 1 dB, the S/N ratio is evaluated to be good, and if it is less than 1 dB, the S/N ratio is evaluated to be not good.

(13) Durability of the Magnetic Layer

The VTR tape prepared in (11) is repeatedly subjected to regeneration and rewinding. The cycle of regeneration-rewinding is repeated 1000 times at 40° C., 80%RH. After this, the S/N ratio is measured. If the decrease in the S/N ratio after the repetition of the cycle is less than 1 dB, the durability is evaluated to be good, and if it is not less than 1 dB, the durability is evaluated to be not good.

The present invention will now be described by way of examples thereof. It should be noted that the examples are presented for the illustration purpose only and should not be interpreted in any restrictive way.

EXAMPLES 1-16, COMPARATIVE EXAMPLES 1-10

Ethyleneglycol slurries containing crosslinked polystyrene particles or spherical silica particles originating from colloidal silica with varying average particle diameters were prepared and were subjected to ester-exchange reaction with dimethyl terephthalate so as to attain the polycondensation. By this operation, pellets of polyethyleneterephthalate (hereinafter referred to as PET) containing 0.05–35% by weight of particles (thermoplastic resin A) were prepared. On the other hand, PET containing 0.2% by weight of spherical silica particles (average particle size of 0.2 μm) originating from colloidal silica (thermoplastic resin B) was prepared by a conventional method.

The thermoplastic polymers A and B were dried under reduced pressure (3 Torr) at 180° C. for 8 hours. Then the thermoplastic resin B was supplied to an extruder 1 and was melted at 285° C. On the other hand, the thermoplastic resin A was supplied to an extruder 2 and was melted at 280° C. These polymers were laminated using a joining block and the polymers were extruded in the laminated condition. The extruded sheet was wound about a casting drum with a surface temperature of 30° C. by the electrostatic casting method so as to solidify the film, thereby obtaining a laminated non-oriented film. By adjusting the amount of the polymer extruded from each extruder, the overall thickness of the film as well as the thickness of the layer A of the thermoplastic resin A was adjusted.

The non-oriented film was drawn in the longitudinal direction at 80° C. with a drawing ratio of 4.0 times the original length. This drawing was performed by utilizing the difference in the circumference velocities of a pair of rolls. The drawing was carried out in three steps by using three pairs of rolls. The resulting unioriented film was then stretched in the lateral direction with a stretching ratio of 4.0 times the original length at 100° C. at a drawing rate of 2000%/min using a stenter. The biaxially oriented film thus obtained is then stretched again in the longitudinal direction with a drawing ratio of 1.65 times the original length. The resultant was then heat set under a constant length at 190° C. for 5 seconds to obtain biaxially oriented laminated films with an overall thickness of 7 μm. Further, for comparison, a biaxially oriented monolayered film with a thickness of 7 μm containing 0.2% by weight of spherical silica particles with an average particle size of 0.2 μm and 0.05% by weight of spherical silica a conventional method.

Magnetic coating solution was applied on the surface of the thus prepared substrate films on the side opposite to the layer A of the thermoplastic resin A. The magnetic solution had the following composition, all parts being by weight:

| | |
|---|---|
| Fe (iron) | 100 parts |
| Average Particle Size: | |
| Length: 0.3 μm | |
| Particle Size Ratio: 10/1 | |
| coercive force: 2000 Oe | |
| Polyurethane Resin | 15 parts |
| Vinyl chloride/vinyl acetate Copolymer | 5 parts |
| Nitrocellulose Resin | 5 parts |
| Aluminum Oxide Powder | 3 parts |
| Average Particle Size: 0.3 μm | |
| Carbon Black | 1 part |
| Lecithin | 2 parts |
| Methylethyl Ketone | 100 parts |
| Methylisobutyl Ketone | 100 parts |
| Toluene | 100 parts |
| Stearic Acid | 2 parts |

This composition was stirred for 48 hours using a ball mill and 6 parts of a curing agent was added thereto. The resulting mixture was filtered through a filter to obtain a magnetic coating solution. The magnetic coating solution was coated on the films and magnetically oriented, followed by drying at 110° C. The resultant was subjected to calender treatment by using a small test calender apparatus (steel roll/Nylon roll, 5 steps) under varying temperatures and line pressures. Thereafter, the film was wound into a roll under varying tensions and the curing of the magnetic coating solution was performed at varying temperatures of 10°–150° C. for 48 hours to obtain magnetic recording media.

The properties of the thus obtained magnetic recording media are shown in Tables 1-3. As can be seen from these tables, the magnetic recording media according to the present invention exhibited high S/N ratio and the reduction of the S/N ratio after repeated running operations was small, so that the durability was good. On the other hand, none of the magnetic recording media outside the scope of the present invention did not simultaneously satisfy the high S/N ratio and the high durability.

Although the present invention was described by way of preferred embodiments thereof, it is apparent for those skilled in the art that various modifications may be made without departing from the spirit and scope of the present invention.

TABLE 1

| | Particles in Thermoplastic Resin A | | | Thickness of Film Layer A (μm) | Averge Particle Size/ Thickness of Film Layer A |
|---|---|---|---|---|---|
| | Average Particle Size (μm) | Material | Content (%) | | |
| Example 1 | 0.3 | Crosslinked Polystyrene | 10 | 0.2 | 1.5 |
| Example 2 | 0.3 | Colloidal Silica | 10 | 0.15 | 2.0 |
| Example 3 | 0.2 | Colloidal Silica | 7 | 0.15 | 1.3 |
| Example 4 | 0.5 | Colloidal Silica | 10 | 0.4 | 1.25 |
| Example 5 | 0.3 | Titanium Dioxide (Rutile) | 10 | 0.2 | 1.5 |
| Example 6 | 0.1 | Colloidal Silica | 3 | 0.06 | 1.7 |
| Comparative Example 1 | 0.3 | Colloidal Silica | 1 | 0.2 | 1.5 |
| Comparative Example 2 | 0.3 | Crosslinked Polystyrene | 35 | 0.2 | 1.5 |
| Comparative Example 3 | 0.3 | Colloidal Silica | 10 | 4.5 | 0.07 |
| Comparative Example 4 | 0.2 | Colloidal Silica | 0.2 | 7 | 0.04 |
| | 0.6 | Colloidal Silica | 0.05 | (Monolayer) | |

| | Surface Configuration of Magnetic Layer | | | | S/N Ratio of Magnetic Recording Media (dB) | Durability of Magnetic Layer (Decrease in S/N Ratio after Running Operation) (dB) |
|---|---|---|---|---|---|---|
| | Configuration | SRv-SRp (nm) | SRv/SRa | SPc | | |
| Example 1 | Depression-dominant | 35 | 8.5 | 430 | +2.5 | 0.2 |
| Example 2 | Depression-dominant | 40 | 7.5 | 370 | +3.0 | 0.1 |
| Example 3 | Depression-dominant | 20 | 9.0 | 350 | +2.0 | 0.3 |
| Example 4 | Depression-dominant | 50 | 6.0 | 450 | +1.5 | 0.2 |
| Example 5 | Depression-dominant | 10 | 8.0 | 260 | +1.2 | 0.5 |
| Example 6 | Depression-dominant | 15 | 7.0 | 550 | +3.0 | 0.5 |
| Comparative Example 1 | Protrusion-dominant | 0 | 15.0 | 45 | 0.0 | 1.5 |

TABLE 1-continued

| | | | | | | |
|---|---|---|---|---|---|---|
| Comparative Example 2 | Protrusion-dominant | −200 | 18.0 | 70 | −2.5 | 1.0 |
| Comparative Example 3 | Protrusion-dominant | −100 | 17.5 | 30 | −2.5 | 2.5 |
| Comparative Example 4 | Protrusion-dominant | −5 | 13.5 | 80 | 0.0 | 3.0 |

*In every Example, film layer A was formed on the side opposite to the magnetic layer.
*The magnetic recording medium of Example 2 has a backcoat layer of 0.5 μm thickness with an average surface roughness Ra of 15 nm.
*The magnetic recording media of Comparative Examples 1 and 2 were prepared by curing the magnetic layer at 20° C. in the rolled condition under a tension of 0.1 kg/m.

TABLE 2

| | Surface Configuration of Magnetic Layer | | Substate Film | | | |
|---|---|---|---|---|---|---|
| | Configuration | SRv/SRa | Maximum Height/ Average Height of Surface Protrusions | Index of Crystallization of Attenuated Total Reflection Raman of Characteristic Surface (cm$^{-1}$) | Relative Standard Deviation of Particle Size | Particle Size Ratio |
| Example 7 | Depression-dominant | 8.0 | 2.5 | 18 | 0.25 | 1.2 |
| Example 8 | Depression-dominant | 8.0 | 2.5 | 17 | 0.30 | 1.05 |
| Example 9 | Depression-dominant | 7.5 | 2.8 | 15 | 0.30 | 1.15 |
| Example 10 | Depression-dominant | 7.8 | 2.4 | 17 | 0.28 | 1.25 |
| Example 11 | Depression-dominant | 9.2 | 2.3 | 16 | 0.35 | 1.1 |
| Example 12 | Depression-dominant | 8.5 | 2.5 | 16 | 0.30 | 1.2 |
| Comparative Example 5 | Protrusion-dominant | 17.5 | 5.5 | 22 | 0.70 | 1.8 |
| Comparative Example 6 | Protrusion-dominant | 18.0 | 6.5 | 21 | 0.75 | 1.85 |
| Comparative Example 7 | Protrusion-dominant | 12.0 | 6.0 | 23 | 0.65 | 1.6 |
| Comparative Example 8 | Protrusion-dominant | 13.5 | 8.0 | 23 | 0.80 | 1.5 |

| | S/N Ratio of Magnetic Recording Media (dB) | Durability of Magnetic Layer (Decrease in S/N Ratio after Running Operation) (dB) |
|---|---|---|
| Example 7 | +3.5 | 0.2 |
| Example 8 | +3.0 | 0.2 |
| Example 9 | +3.5 | 0.1 |
| Example 10 | +2.5 | 0.2 |
| Example 11 | +4.0 | 0.1 |
| Example 12 | +3.0 | 0.4 |
| Comparative Example 5 | 0.0 | 2.5 |
| Comparative Example 6 | −1.0 | 2.0 |
| Comparative Example 7 | 0.0 | 2.5 |
| Comparative Example 8 | −0.5 | 3.0 |

TABLE 3

| | Surface Configuration of Magnetic Layer | | Substate Film | | | S/N Ratio of Magnetic Recording Media (dB) | Durability of Magnetic Layer (dB) |
|---|---|---|---|---|---|---|---|
| | Configuration | SRv/Sra | Average Height/ Average Particle size of Surface Protrusions | Number of Protrusions with Height of not Higher Than ⅓ of Average Particle Size/Total Number of Protrusions | Number of Protrusions (Protrusions/mm$^2$) | | |
| Example 13 | Depression-dominant | 12.0 | 0.4 | 34 | 400000 | +1.2 | 0.9 |
| Example 14 | Depression-dominant | 11.0 | 0.5 | 21 | 180000 | +1.1 | 0.8 |
| Example 15 | Depression-dominant | 13.0 | 0.3 | 54 | 2000000 | +1.5 | 0.9 |
| Example 16 | Depression-dominant | 15.0 | 0.67 | 11 | 350000 | +1.3 | 0.7 |
| Comparative Example 9 | Protrusion-dominant | 18.0 | 0.5 | 34 | 5000 | +0.2 | 3.0 |
| Comparative Example 10 | Protrusion-dominant | 12.0 | 0.23 | 75 | 350000 | −1.5 | 2.0 |

We claim:

1. A magnetic recording medium comprising a substrate film and a magnetic layer formed on at least one surface of said substrate film, said magnetic layer having an irregular surface of peaks and depressions such that the maximum depth of depressions in said surface of said magnetic layer from center plane thereof are greater than the maximum height of the peaks of said protrusions on the surface of said magnetic layer from center plane thereof by an amount of at least 10 nm.

2. The magnetic recording medium of claim 1, wherein said maximum depth is larger than said maximum height by not less than 20 nm.

3. The magnetic recording medium of claim 1, wherein the ratio of said maximum depth to average surface roughness SRa of said surface of said magnetic layer is not more than 10.

4. The magnetic recording medium of claim 1, wherein the number of peaks on said surface of said magnetic layer, which cross a region of −5 nm to +5 nm from center plane of said surface of said magnetic layer in the direction of thickness thereof, is not less than 100/0.1 mm$^2$.

5. The magnetic recording medium of claim 1, wherein said substrate film is a biaxially oriented thermoplastic resin film which has a layer A with a thickness of 0.005-3 μm containing as major component a thermoplastic resin and particles with an average particle size of 0.1-10 times the thickness of said layer A, the content of said particles in said layer A being 0.1-30% based on the total weight of said layer A, said layer A being formed at least on the side opposite to said magnetic layer.

6. The magnetic recording medium of claim 1, wherein said substrate film is a biaxially oriented thermoplastic resin film which contains particles and which has protrusions on a surface thereof, the average height of said protrusions being not less than ¼ of the average particle size of said particles, the number of said protrusions being not less than 10,000/mm², said surface having said protrusions being formed at least on the side opposite to said magnetic layer.

7. The magnetic recording medium of claim 1, wherein said substrate film is a biaxially oriented thermoplastic resin film which contains particles and which has a surface with protrusions, the number of these protrusions having a height of not higher than ⅓ of the average particle size of said particles being not more than 70% of the total protrusions, said surface being formed at least on the side opposite to said magnetic layer.

8. The magnetic recording medium of claim 1, wherein said substrate film is a biaxially oriented thermoplastic resin film which has a surface with protrusions, the ratio of maximum height to average height of said protrusions being 1.1-3, said surface with protrusions being formed at least on the side opposite to said magnetic layer.

9. The magnetic recording medium of claim 1, wherein said substrate film is a crystalline polyester film having a surface with a crystallization index of attenuated total reflection Raman of not more than 20 cm$^{-1}$.

10. The magnetic recording medium of claim 1, wherein said substrate film is a biaxially oriented thermoplastic resin film containing particles with a relative standard deviation of their particle size of not more than 0.6.

11. The magnetic recording medium of claim 1, wherein said substrate film is a biaxially oriented thermoplastic resin film containing particles with a particle size ratio (longer particle diameter/shorter particle diameter) of 1.0-1.3.

* * * * *

UNITED STATES PATENT AND TRADEMARK OFFICE
CERTIFICATE OF CORRECTION

PATENT NO. : 5,266,376
DATED : November 30, 1993
INVENTOR(S) : Iwao Okazaki et al It is certified that error appears in the above-indentified patent and that said Letters Patent is hereby corrected as shown below:

In Column 13, line 37, after "silica" insert --with an average particle size of 0.6 μm was prepared by--

Signed and Sealed this

Tenth Day of May, 1994

Attest:

BRUCE LEHMAN

Attesting Officer          Commissioner of Patents and Trademarks